(12) United States Patent
Tsuchiya (10) Patent No.: US 8,319,922 B2
(45) Date of Patent: Nov. 27, 2012

(54) LIQUID CRYSTAL DISPLAY AND ELECTRONIC APPARATUS

(75) Inventor: Hitoshi Tsuchiya, Chino (JP)

(73) Assignee: Sony Corporation, Tokyo (JP)

( * ) Notice: Subject to any disclaimer, the term of this patent is extended or adjusted under 35 U.S.C. 154(b) by 372 days.

(21) Appl. No.: 12/416,361

(22) Filed: Apr. 1, 2009

(65) Prior Publication Data

US 2009/0262288 A1 Oct. 22, 2009

(30) Foreign Application Priority Data

Apr. 16, 2008 (JP) ................................. 2008-106464

(51) Int. Cl.
*G02F 1/1335* (2006.01)
(52) U.S. Cl. .................. 349/117; 349/114; 349/121
(58) Field of Classification Search .................. 349/114, 349/117, 121
See application file for complete search history.

(56) References Cited

U.S. PATENT DOCUMENTS

| | | | | |
|---|---|---|---|---|
| 5,583,679 | A * | 12/1996 | Ito et al. | 349/118 |
| 6,747,712 | B2 * | 6/2004 | Noh et al. | 349/39 |
| 7,889,295 | B2 * | 2/2011 | Kimura et al. | 349/114 |
| 7,995,168 | B2 * | 8/2011 | Nishimura et al. | 349/114 |
| 2004/0105059 | A1 * | 6/2004 | Ohyama et al. | 349/114 |
| 2004/0212763 | A1 * | 10/2004 | Tsuchiya | 349/114 |
| 2006/0044498 | A1 * | 3/2006 | Lee et al. | 349/117 |
| 2007/0165165 | A1 * | 7/2007 | Joten | 349/119 |

FOREIGN PATENT DOCUMENTS

| | | |
|---|---|---|
| JP | 2005-338256 | 12/2005 |
| JP | 2006-171376 | * 6/2006 |
| JP | 2007-047732 | 2/2007 |
| JP | 2007-212498 | 8/2007 |

\* cited by examiner

*Primary Examiner* — Mark Robinson
*Assistant Examiner* — Robert Tavlykaev
(74) *Attorney, Agent, or Firm* — K&L Gates LLP (57) ABSTRACT

In a transflective liquid crystal display device, a liquid crystal layer has horizontal alignment, and a polarizing plate having a transmission axis parallel with or orthogonal to an alignment direction of the liquid crystal layer is provided on a side opposite to the liquid crystal layer of an element substrate, and a polarizing plate having a transmission axis orthogonal to that of the polarizing plate is provided on a side opposite to the liquid crystal layer of a counter substrate. A resin layer having a first resin layer and a second resin layer being λ/2 retardation films is provided on the liquid crystal layer side of the counter substrate, and a slow axis of the first resin layer is disposed so as to be parallel with or orthogonal to the transmission axis of the polarizing plate, and a slow axis of the second resin layer crosses the alignment direction of the liquid crystal layer. A step portion is provided between the element substrate and the resin layer, and an end of the step is formed into a slope portion having a continuously changing thickness, and the slope portion is disposed in a transmissive display region.

5 Claims, 7 Drawing Sheets

LIQUID CRYSTAL DISPLAY AND ELECTRONIC APPARATUS

RELATED APPLICATIONS

The present application is based on, and claims priority from, Japanese Application Number 2008-106464, filed Apr. 16, 2008, the disclosure of which is hereby incorporated by reference herein in its entirety.

BACKGROUND

1. Technical Field

The present invention relates to a liquid crystal display and an electronic apparatus.

2. Related Art

As a light modulation device of various electro-optical devices, a liquid crystal display is used, and in recent years, it is widely used for various purposes. Such a liquid crystal display includes a transflective liquid crystal display which includes a reflective display mode using external light and a transmissive display mode using an internal light source, such as a backlight, as a display mode. The transflective liquid crystal display selectively uses one display mode of a reflective mode and a transmissive mode in accordance with ambient brightness. In this case, power consumption can be reduced, and clear display can be performed even in the dark.

In the transflective liquid crystal display, a phase difference is likely to be produced between a region for reflective display (reflective display region) and a region for transmissive display (transmissive display region) due to different display methods. For this reason, in general, a phase layer for phase adjustment is provided, and optical compensation is performed.

However, the phase difference of the phase layer depends on a viewing angle. For this reason, even if the phase difference is optimized in a direction normal to the phase layer, an optimum compensation condition is not attained as increasing distance from the direction normal to the phase layer. As a result, the viewing angle becomes narrow.

Accordingly, with respect to such a transflective liquid crystal display, it has been studied that a transverse electric field driving liquid crystal display having a wide viewing angle is applied in order to increase the viewing angle (for example, JP-A-2005-338256 and JP-A-2007-212498). In the transverse electric field mode, an in-plane (transverse) electric field is generated with respect to a substrate, and liquid crystal molecules are rotated by the transverse electric field within a plane parallel to the substrate, thereby controlling light to be transmitted. The transverse electric field mode includes an IPS (In-Plane Switching) mode and an FFS (Fringe-Field Switching) mode, which is an improvement of the IPS mode.

According to the method described in JP-A-2005-338256, a phase layer is formed so as to be patterned only in the reflective display region, thereby providing an internal phase layer. Thus, the transmissive display region has a wide viewing angle. According to the method described in JP-A-2007-212498, optical compensation is performed by a phase layer with the direction of a slow axis thereof controlled, and a liquid crystal layer thickness adjusting layer is provided in order to make the thickness of the liquid crystal layer in the reflective display region smaller than the thickness of the liquid crystal layer in the transmissive display region. Both display regions are different in the thickness of the liquid crystal layer. In this way, light to be transmitted is arranged to have an equal optical path length, and the phase difference is eliminated. As a result, high-quality image display is realized.

The phase layer or the liquid crystal layer thickness adjusting layer described in the above-described documents is formed by patterning an ultraviolet curable material. When the phase layer or the liquid crystal layer thickness adjusting layer is patterned, the end portion of the phase layer or the liquid crystal layer thickness adjusting layer slopes. The above-described documents illustrate a liquid crystal display in which the end portion of the phase layer or the liquid crystal layer thickness adjusting layer slopes.

If a region where such a slope portion is formed is present in the reflective display region, an optical characteristic of the corresponding region is different from that of a region, which is formed flat as designed, and accordingly an optical condition for dark display is not attained. When this happens, light leakage occurs from the region where the slope portion is formed. Light leakage causes an unclear image with contrast deteriorated. Meanwhile, a light-shielding black matrix may be provided so as to overlap the slope portion. In this case, however, the pixel aperture ratio decreases so much. In the case of a high-definition pixel, luminance is deteriorated, and a satisfactory display characteristic is not attained.

SUMMARY

An advantage of some aspects of the invention is that it provides a liquid crystal display capable of suppressing light leakage during dark display and realizing high-contrast display for reflective display and transmissive display. Another advantage of some aspects of the invention is that it provides an electronic apparatus including such a liquid crystal display capable of realizing high-quality image display.

According to a first aspect of the invention, a liquid crystal display includes a first substrate and a second substrate opposite each other with a liquid crystal layer interposed therebetween, first and second electrodes provided on a side of the first substrate facing the liquid crystal layer to drive the liquid crystal layer, and a reflecting layer provided on a part of the side of the first substrate facing the liquid crystal layer. Each pixel region includes a reflective display region where light incoming from the second substrate is reflected by the reflecting layer toward the second substrate to perform display, and a transmissive display region where light incoming from the first substrate is transmitted toward the second substrate to perform display. The liquid crystal layer has horizontal alignment in an initial alignment state. A first polarizing plate is provided on a side of the first substrate opposite the liquid crystal layer, the first polarizing plate having a transmission axis parallel or perpendicular to an alignment direction of the liquid crystal layer in the initial alignment state. A second polarizing plate is provided on a side of the second substrate opposite the liquid crystal layer, the second polarizing plate having a transmission axis perpendicular to the transmission axis of the first polarizing plate. A resin layer is provided on a side of the second substrate facing the liquid crystal layer, the resin layer having a first resin layer provided in the transmissive display region and a second resin layer provided in the reflective display region. The first resin layer is a λ/2 phase layer giving a phase difference of approximately ½ wavelength (wavelength: λ) with respect to visible light, and a slow axis of the first resin layer and the transmission axis of the first polarizing plate are disposed so as to be parallel or perpendicular to each other. The second resin layer is a λ/2 phase layer giving a phase difference of approximately ½ wavelength with respect to visible light, and a slow axis of the second resin layer is set in a direction intersecting the alignment direction of the liquid crystal layer. A step portion is provided between the first substrate and the resin layer in order to make the thickness of the liquid crystal layer in the reflective display region smaller than the thickness of the liquid crystal layer in the transmissive display region. A slope portion having a continuously changing thickness is provided in an end portion of the step portion. The slope portion is disposed in the transmissive display region.

Light incident on the transmissive display region through the first polarizing plate side first transmits the first polarizing plate to be converted into linearly polarized light having a vibration plane substantially parallel to the transmission axis of the first polarizing plate. In this aspect, the first resin layer that is disposed so as to overlap the transmissive display region is a phase layer, and the slow axis of the first resin layer and the alignment direction of the liquid crystal layer are parallel or perpendicular to each other. For this reason, the optical axis of each constituent member is disposed so as to be substantially parallel or perpendicular to the vibration plane of linearly polarized light incident on the transmissive display region. The optical axis arranged in such a manner is optically inactive with respect to linearly polarized light transmitting the first polarizing plate. Therefore, incoming linearly polarized light is not optically influenced. As a result, linearly polarized light is satisfactorily shielded by the second polarizing plate having the transmission axis perpendicular to the transmission axis of the first polarizing plate.

With the above-described configuration, the slope portion in which the thickness of the liquid crystal layer continuously changes is disposed in the transmissive display region. The slope portion may cause a difference in optical path of light transmitting the liquid crystal layer, and consequently a phase difference. However, similarly to the above-described behaviors of light, light incident on the slope portion is converted into linearly polarized light, which is optically inactive with respect to the liquid crystal layer, and thus light is not optically influenced until it is incident on the slope portion. For this reason, light transmitting the liquid crystal layer having a different thickness overlapping the slope portion has no phase difference and is satisfactorily shielded by the second polarizing plate. Therefore, it is possible to provide a liquid crystal display that can perform high-contrast display without light leakage in the transmissive display region, in which the slope portion is disposed, and can perform high-contrast display for reflective display and transmissive display.

According to a second aspect of the invention, a liquid crystal display includes a first substrate and a second substrate opposite to each other with a liquid crystal layer interposed therebetween, first and second electrodes provided on a side of the first substrate facing the liquid crystal layer to drive the liquid crystal layer, and a reflecting layer provided on a part of the side of the first substrate facing the liquid crystal layer. Each pixel region includes a reflective display region where light incoming from the second substrate is reflected by the reflecting layer toward the second substrate to perform display and a transmissive display region where light incoming from the first substrate is transmitted toward the second substrate to perform display. The liquid crystal layer has horizontal alignment in an initial alignment state. A first polarizing plate is provided on a side of the first substrate opposite the liquid crystal layer, the first polarizing plate having a transmission axis parallel or perpendicular to an alignment direction of the liquid crystal layer in the initial alignment state. A second polarizing plate is provided on a side of the second substrate opposite the liquid crystal layer, the second polarizing plate having a transmission axis perpendicular to the transmission axis of the first polarizing plate. A resin layer is provided on a side of the second substrate facing the liquid crystal layer, the resin layer having a first resin layer provided in the transmissive display region and a second resin layer provided in the reflective display region. The first resin layer is an isotropic layer having no optical anisotropy with respect to visible light. The second resin layer is a $\lambda/2$ phase layer giving a phase difference of approximately ½ wavelength with respect to visible light, and a slow axis of the second resin layer is set in a direction intersecting the alignment direction of the liquid crystal layer. A step portion is provided between the first substrate and the resin layer in order to make the thickness of the liquid crystal layer in the reflective display region smaller than the thickness of the liquid crystal layer in the transmissive display region. A slope portion having a continuously changing thickness is provided in an end portion of the step portion. The slope portion is disposed in the transmissive display region.

Light incident on the transmissive display region through the first polarizing plate first transmits the first polarizing plate to be converted into linearly polarized light having a vibration plane substantially parallel to the transmission axis of the first polarizing plate. In this aspect, the alignment direction of the liquid crystal layer is perpendicular or parallel with respect to the transmission axis of the first polarizing plate. The first resin layer that is disposed so as to overlap the transmissive display region is an isotropic layer having no optical anisotropy. The optical axis and the isotropic layer arranged in such a manner are optically inactive with respect to linearly polarized light transmitting the first polarizing plate. Therefore, incoming linearly polarized light is not optically influenced. As a result, linearly polarized light is satisfactorily shielded by the second polarizing plate having the transmission axis perpendicular to the transmission axis of the first polarizing plate.

With the above-described configuration, similarly to the liquid crystal display according to the first aspect of the invention, the slope portion in which the thickness of the liquid crystal layer continuously changes is disposed in the transmissive display region. However, similarly to the above-described behaviors of light, light incident on the slope portion is converted into linearly polarized light, which is optically inactive with respect to the liquid crystal layer, and thus light is not optically influenced until it is incident on the slope portion. For this reason, light transmitting the liquid crystal layer having a different thickness overlapping the slope portion has no phase difference and is satisfactorily shielded by the second polarizing plate. Therefore, it is possible to provide a liquid crystal display that can realize high-contrast display without light leakage in the transmissive display region in which the slope portion is disposed and can realize high-contrast display for reflective display and transmissive display.

The resin layer may be formed of a polymerizable liquid crystal material to have a uniform thickness.

With this configuration, there is no difference in optical path due to a difference in thickness between the first resin layer and the second resin layer or a composite change in thickness of the liquid crystal layer caused by the difference in thickness and the shape of the slope portion. Therefore, by managing the arrangement of the slope portion, high-contrast display can be realized without light leakage. In addition, design and manufacturing are facilitated, as compared with the first resin layer and the second resin layer are separately formed.

The liquid crystal layer of the reflective display region may have such a thickness as to give a phase difference of approximately $\lambda/4$ wavelength with respect to light transmitting the liquid crystal layer in the initial alignment state, and an acute angle between the slow axis of the second resin layer and the alignment direction of the liquid crystal layer may be 67.5°.

With this configuration, light incident on the reflective display region transmit the λ/2 phase layer formed by the second resin layer and the liquid crystal layer having such a thickness as to give a phase difference of λ/4 wavelength to be satisfactorily converted into broad circularly polarized light. As a result, higher contrast of reflective display can be realized.

According to a third aspect of the invention, an electronic apparatus includes the above-described liquid crystal display.

With this configuration, it is possible to provide an electronic apparatus including a display section capable of performing vivid display with a high contrast ratio.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a liquid crystal display according to a first embodiment of the invention will be described with reference to FIGS. 1 to 5B. In the drawings, the scale of thickness or dimension of each constituent element has been adjusted so as to be recognizable.

Figure 1:
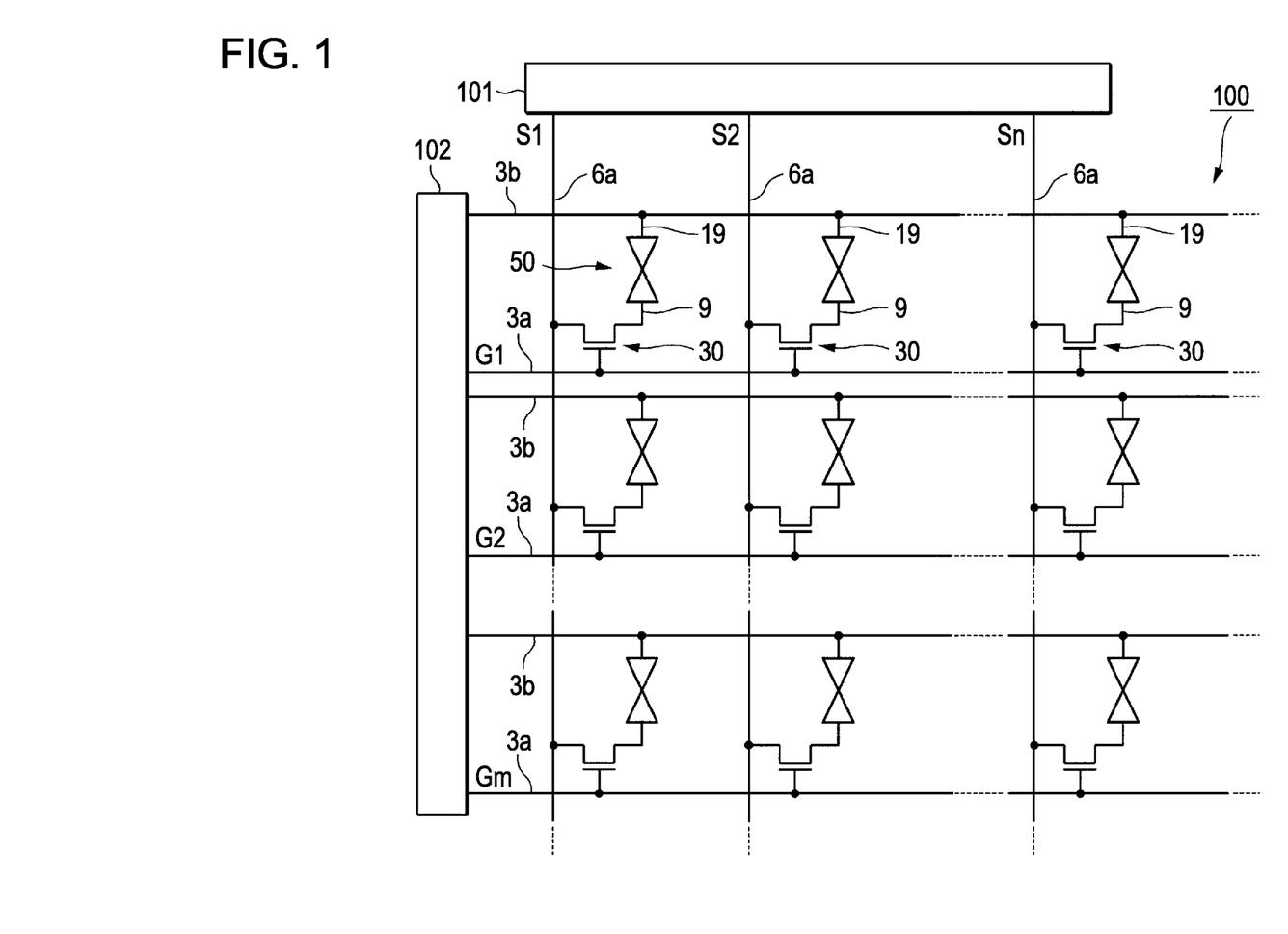
FIG. 1 is a circuit diagram of a liquid crystal display according to a first embodiment of the invention.

FIG. 1 is a circuit diagram of a liquid crystal display 100 of this embodiment. In each of a plurality of pixel regions that are arranged in a matrix to form an image display region of the liquid crystal display 100, a pixel electrode 9 and a TFT 30 for switching the pixel electrode 9 are formed. A liquid crystal layer 50 is interposed between the pixel electrode 9 and a common electrode 19. The common electrode 19 is electrically connected to common lines 3b extending from a scanning line driving circuit 102 to hold a plurality of subpixels at a common potential.

Each of data lines 6a extending from a data line driving circuit 101 is electrically connected to a source of the corresponding TFT 30. The data line driving circuit 101 supplies image signals S1, S2, . . . , and Sn to the subpixels through the data lines 6a. The image signals S1 to Sn may be sequentially supplied in that order or may be supplied for each group having a plurality of adjacent data lines 6a.

Each of scanning lines 3a extending from the scanning line driving circuit 102 is electrically connected to a gate of the corresponding TFT 30. Scanning signals G1, G2, . . . , and Gm that are supplied from the scanning line driving circuit 102 to the scanning lines 3a in a pulsed manner with predetermined timing are linear-sequentially applied to the gates of the TFTs 30 in that order. Each of the pixel electrodes 9 is electrically connected to a drain of the corresponding TFT 30. If the scanning signals G1, G2, . . . , and Gm are input and the TFTs 30 serving as switching elements are turned on for a predetermined period, the image signals S1, S2, . . . , and Sn that are supplied from the data lines 6a are written in the pixel electrodes 9 with predetermined timing. The image signals S1, S2, . . . , and Sn at predetermined levels written in liquid crystal through the pixel electrodes 9 are held for a predetermined period between the pixel electrodes 9 and the common electrode 19 opposite each other with liquid crystal interposed therebetween.

Next, the planar wiring structure around a pixel region in the liquid crystal display 100 of this embodiment will be described with reference to a plan view of FIG. 2. Each of the pixel regions of the liquid crystal display 100 includes three subpixel regions individually having color filters (not shown) of respective colors of R, G, and B. In each of the subpixel regions, the latter-shaped pixel electrode 9 having a plurality of inner slits 29 and 39 is formed. The scanning line 3a, the common line 3b, and a plurality of data lines 6a are disposed so as to surround the periphery of each of the pixel electrodes 9.

The TFTs 30 serving as switching elements are individually formed near intersections of the scanning lines 3a and the data lines 6a. Each of the TFTs 30 is electrically connected to the corresponding data line 6a and the corresponding pixel electrode 9. The substantially rectangular common electrode 19 is formed so as to overlap the pixel electrodes 9 in plan view.

The pixel electrodes 9 are conductive films formed of a transparent conductive material, such as ITO or the like. From among the slits 29 and 39 of each of the pixel electrodes 9, a plurality of slits 29 (in the drawing, 10 slits) having a large width are arranged at predetermined intervals in a region near the TFT 30. A plurality of slits 39 (in the drawing, 13 slits) having a small width are arranged at predetermined intervals in a region near the common line 3b, not in the region where the slits 29 are formed. The slits 29 and 39 are formed so as to extend in a direction intersecting the scanning lines 3a and the data lines 6a, and the slits 29 and 39 are parallel to each other.

Each of the pixel electrodes 9 has a plurality of strip electrode portions 9c (in the drawing, 9 strip electrode portions) having a large width between a plurality of slits 29, and a plurality of strip electrode portions 9d (in the drawing, 12 strip electrode portions) having a small width between a plurality of slits 39.

The common electrode 19 includes a transparent common electrode 19t formed of a transparent conductive material, such as ITO or the like, to have a substantially rectangular shape in plan view, and a reflective common electrode 19r formed of a light-reflective metal material, such as aluminum or silver, to have a substantially rectangular shape in plan view. The transparent common electrode 19t and the reflective common electrode 19r are electrically connected to each other through edge portions thereof. In this embodiment, the reflective common electrode 19r is formed integrally with the common line 3b extending parallel to the scanning line 3a. Therefore, the common electrode 19 including the transparent common electrode 19t and the reflective common electrode 19r is electrically connected to the common line 3b.

A region where the reflective common electrode 19r is to be formed forms the reflective display region R of a corresponding subpixel, and a region where the transparent common electrode 19t is to be formed forms the transmissive display region T of the corresponding subpixel. The slits 39 having a small width and the strip electrode portions 9d are disposed in a region of the pixel electrode 9 overlapping the reflective common electrode 19r, and the slits 29 having a large width and the strip electrode portions 9c are formed in a region of the pixel electrode 9 overlapping the transparent common electrode 19t.

In this embodiment, the width of each of the strip electrode portions 9d in the reflective display region R is 2 μm, and an interval between adjacent strip electrode portions 9d is 3 μm. Similarly, the width of each of the strip electrode portions 9c in the transmissive display region T is 4 μm, and an interval between adjacent strip electrode portions 9c is 6 μm.

The common line 3b and the reflective common electrode 19r may be formed of different conductive films and electrically connected to each other. In this case, the reflective common electrode 19r may be formed in a wiring layer different from the common line 3b, and the reflective common electrode 19r and the common line 3b may be connected to each other through a contact hole in an interlayer insulating film.

The alignment direction (alignment regulation direction) of an alignment film is indicated by an arrow 151, and is parallel to an extension direction of the scanning lines 3a. The strip electrode portions 9c and 9d are disposed so as to be inclined at approximately 5° with respect to the alignment regulation direction 151. For this reason, when voltage is applied, an electric field is generated in a direction indicated by reference numeral v perpendicular to the extension direction of the strip electrode portions. Therefore, the alignment regulation direction 151 intersects the electric field generation direction v. In an initial state where no voltage is applied, the angle θ between liquid crystal molecules LC and the strip electrode portions 9c and 9d becomes approximately 5° in accordance with the alignment regulation direction 151.

Each of the TFTs 30 includes an island-shaped semiconductor layer 35 formed of an amorphous silicon film partially formed on the scanning line 3a, a source electrode 31 branching off from the data line 6a and extending onto the semiconductor layer 35, and a rectangular drain electrode 32 extending from the semiconductor layer 35 to a region where the pixel electrode 9 is to be formed. The scanning line 3a functions as a gate electrode of the TFT 30 at a position opposite the semiconductor layer 35. The drain electrode 32 and the pixel electrode 9 are electrically connected to each other through a pixel contact hole 47, which is formed at a position where the drain electrode 32 and the pixel electrode 9 overlap each other in plan view.

A region where the pixel electrode 9 and the common electrode 19 overlap each other in plan view functions as a capacitor of the corresponding subpixel region. As a result, a high aperture ratio can be obtained without providing an additional storage capacitor. In this way, the planar wiring structure of the liquid crystal display 100 is formed.

Figure 2:
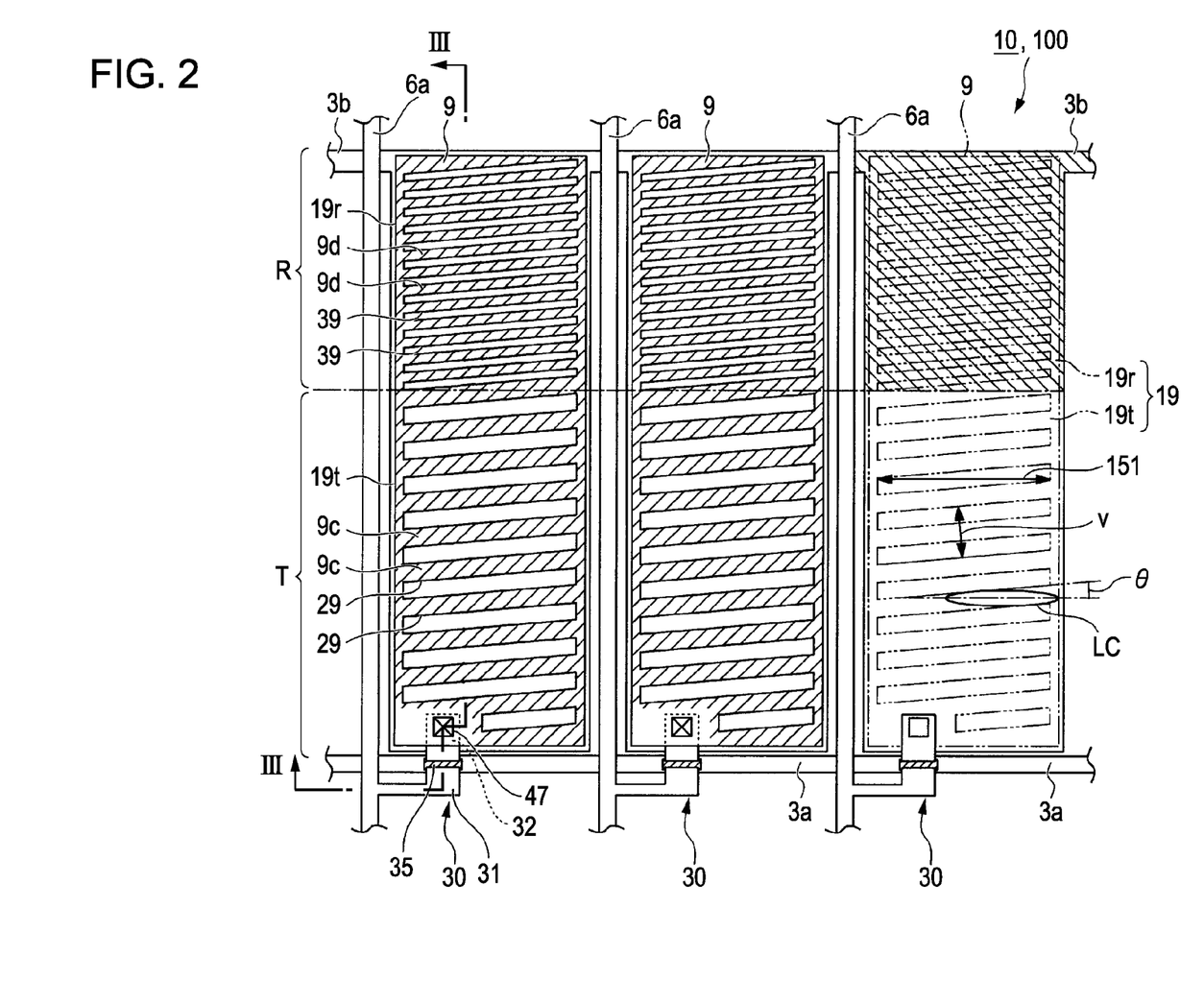
FIG. 2 is a plan view illustrating a pixel region of the liquid crystal display according to the first embodiment.
Figure 3:
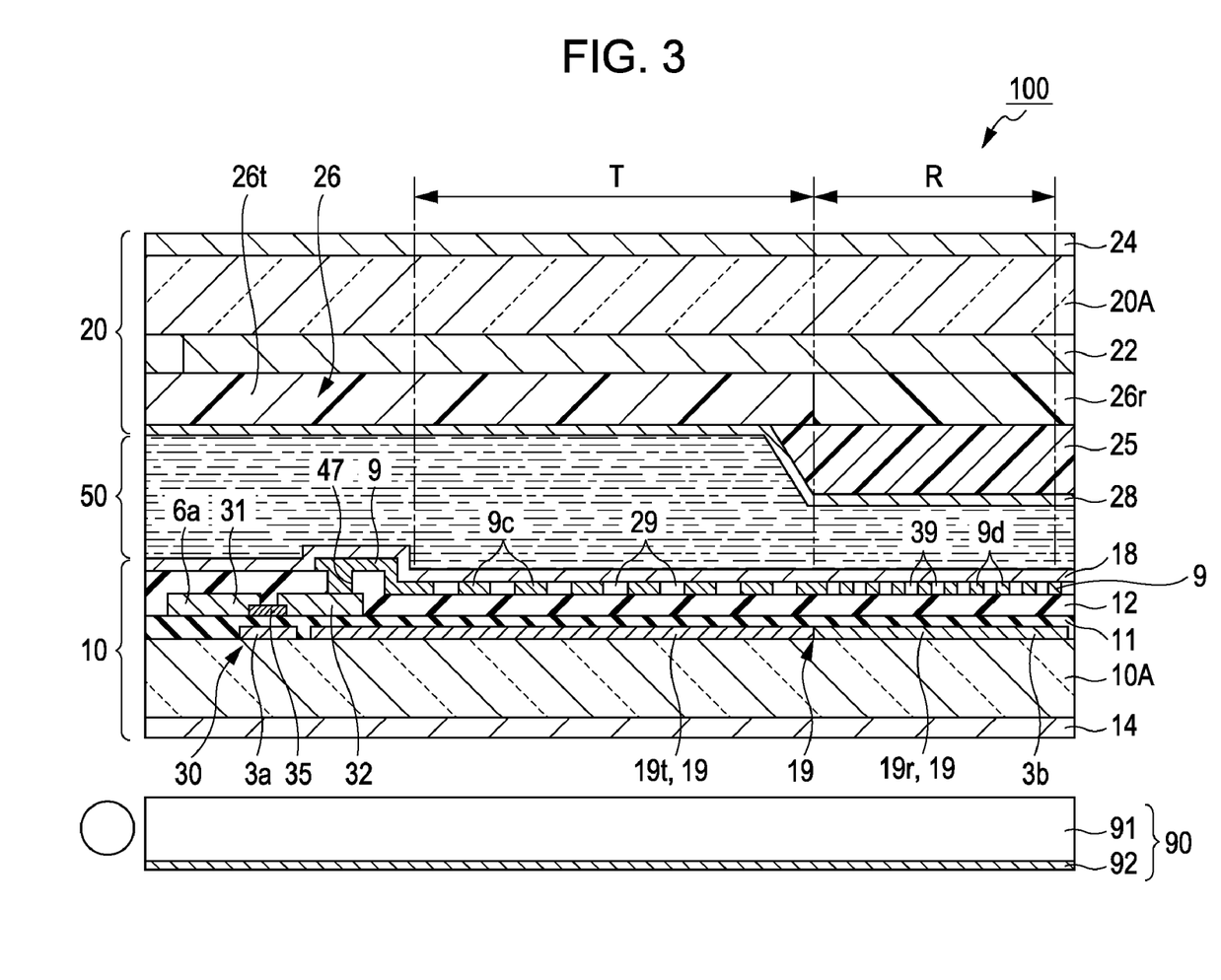
FIG. 3 is a sectional view illustrating the configuration of the liquid crystal display according to the first embodiment.

FIG. 3 is a sectional view illustrating the liquid crystal display 100 of this embodiment. FIG. 3 is a sectional view taken along the line III-III of FIG. 2. The liquid crystal display 100 of this embodiment uses an FFS mode from among the transverse electric field modes, in which an electric field (transverse electric field) in a substrate surface direction is applied to the liquid crystal layer, and the angle of direction of a liquid crystal material is controlled, thereby performing image display.

The liquid crystal display 100 includes an element substrate (first substrate) 10 and a counter substrate (second substrate) 20 arranged to be opposite each other, and a liquid crystal layer 50 interposed between the substrates. An end portion of the element substrate 10 and an end portion of the counter substrate 20 are bonded to each other by a sealant (not shown). Liquid crystal molecules forming the liquid crystal layer 50 are filled between the substrates.

A backlight (illumination device) 90 including a light guide plate 91 and a reflecting plate 92 is provided on an apparatus's outer surface side of the element substrate 10 (a side opposite to the liquid crystal layer 50). The liquid crystal display 100 uses a transflective display mode, and is provided with a transmissive display region T where light from the backlight 90 is modulated by the liquid crystal layer 50 to perform display and a reflective display region R where external light from the counter substrate 20 into the apparatus is modulated by the liquid crystal layer 50 to perform display.

The element substrate 10 has the scanning line 3a, the common electrode 19, and the common line 3b on a substrate main body 10A formed of a transparent material. A thin insulating film 11 is formed of a silicon oxide film or the like so as to cover the scanning line 3a, the common electrode 19, and the common line 3b. The island-shaped semiconductor layer 35 is formed on the thin insulating film 11. The source electrode 31 and the drain electrode 32 are also formed on the thin insulating film 11 so as to partially overlap the semiconductor layer 35, to thereby form the TFT 30.

An interlayer insulating film 12 is formed of a silicon oxide film or a resin film so as to cover the TFT 30, and the pixel electrode 9 is formed on the interlayer insulating film 12. The pixel electrode 9 and the drain electrode 32 are electrically connected to each other through the pixel contact hole 47, which passes through the interlayer insulating film 12 to reach the drain electrode 32. The semiconductor layer 35 and various wiring lines may be formed by patterning using photolithography and then etching, or may be appropriately formed by a known method, such as deposition or sputtering.

An alignment film 18 is formed of polyimide or the like so as to cover the pixel electrode 9. The alignment film 18 is subjected to an alignment treatment, such as a rubbing treatment or the like, such that liquid crystal is aligned in a predetermined direction.

As described above, the alignment regulating direction by the alignment film 18 is parallel to the extension direction of the scanning lines 3a in FIG. 2, and intersects the extension direction of the slits 29 and 39 of the pixel electrode 9 at an angle of approximately 5°.

The counter substrate 20 has, on a side of a substrate main body 20A facing the liquid crystal layer 50, a color filter 22, a phase layer (resin layer) 26 formed on the color filter 22 to have a transmissive portion phase layer (first resin layer) 26t and a reflective portion phase layer (second resin layer) 26r, a liquid crystal layer thickness adjusting layer 25 formed to overlap the reflective portion phase layer 26r, and an alignment film 28 formed to cover the liquid crystal layer thickness adjusting layer 25 and the transmissive portion phase layer 26t.

The color filter 22 includes color material layers corresponding to the subpixel regions. With the color filter 22, incident light from the backlight 90 is modulated into a red light component, a green light component, and a blue light component, and the light components of the respective colors are mixed, thereby performing full color display.

The phase layer 26 gives a phase difference of approximately ½ wavelength (λ/2) with respect to light to be transmitted. The phase layer 26 is a so-called inside phase layer that is provided on the inner surface side of the substrate main body 20A. The phase layer 26 may be formed, for example, by coating a solution of liquid crystalline monomer or oligomer (polymerizable liquid crystal material) or a solution of polymer liquid crystal on the alignment film, and solidifying the solution while alignment is made in a predetermined direction. The phase difference that is given to light to be transmitted by the phase layer 26 may be adjusted in accordance with the type of liquid crystalline polymer as a material forming the phase layer 26 or the thickness of the phase layer 26. In this embodiment, the phase difference of the phase layer 26 is 280 nm.

The transmissive portion phase layer 26t of the phase layer 26 is selectively formed in a planar region corresponding to the transmissive display region T of the subpixel. The reflective phase layer 26r of the phase layer 26 is selectively formed in a planar region corresponding to the reflective display region R of the subpixel. The slow axis of the reflective portion phase layer 26r formed in the reflective display region R and the slow axis of the transmissive portion phase layer 26t formed in the transmissive display region T are set in different directions in plan view. The slow axis of the phase layer 26 will be described below in detail.

The phase layer 26 may be formed, for example, by the following method. First, an alignment film (not shown) for forming a phase layer is formed on the color filter 22, and a mask rubbing treatment is performed on the alignment film. The alignment film in the transmissive display region T and the alignment film in the reflective display region R are subject to a rubbing treatment in different directions. Next, liquid crystal having an optical functional group forming the phase layer is coated on the alignment film as a polymerizable liquid crystal material and aligned separately in the rubbing directions, and light is irradiated to harden the polymerizable liquid crystal material. In this way, the reflective portion phase layer 26r and the transmissive portion phase layer 26t may be separately formed in the single phase layer 26. With respect to the alignment treatment of the alignment film for forming the phase layer, an optical alignment treatment, instead of the rubbing treatment, may be used.

The liquid crystal layer thickness adjusting layer 25 is formed on the phase layer 26 so as to overlap a planar region corresponding to the reflective display region R. The liquid crystal layer thickness adjusting layer 25 is formed of, for example, a material having no optically active axis of direction, such as acrylic resin. Due to the thickness of the liquid crystal layer thickness adjusting layer 25, the thickness of the liquid crystal layer 50 in the reflective display region R becomes smaller than the thickness of the liquid crystal layer in the transmissive display region T. That is, a so-called multi-gap structure is provided. Incidentally, in both the display regions, the liquid crystal layer has an equal optical path.

The liquid crystal layer thickness adjusting layer 25 has a slope portion 25b that slopes from the liquid crystal layer 50 toward the phase layer 26, and the slope portion 25b is entirely formed so as to overlap a planar region corresponding to the transmissive display region T. The invention is characterized by the arrangement of the slope portion 25b. The optical behavior in the region overlapping the slope portion 25b in plan view will be described below in detail with reference to the drawings.

The alignment film 28 has the same configuration as the alignment film 18 on the element substrate 10, and the alignment regulation direction by the alignment film 28 is anti-parallel to the alignment regulating direction of the alignment film 18. Therefore, in the initial alignment state, the liquid crystal layer 50 has horizontal alignment between the element substrate 10 and the counter substrate 20.

A polarizing plate (first polarizing plate) 14 is provided on a surface of the element substrate 10 opposite the liquid crystal layer 50. A polarizing plate (second polarizing plate) 24 is provided on a surface of the counter substrate 20 opposite the liquid crystal layer 50.

The liquid crystal layer 50 has liquid crystal molecules having positive dielectric anisotropy. A difference $\Delta n$ between a normal optical refractive index $n_o$ and an abnormal optical refractive index $n_e$ is 0.1. The thickness of the liquid crystal layer in the transmissive display region T is 3.4 μm, and the thickness of the liquid crystal layer in the reflective display region R is 1.4 μm (the designed value of the thickness of the liquid crystal layer thickness adjusting layer 25 is 2 μm). The liquid crystal layer in the reflective display region R has such a thickness as to give a phase difference of λ/4 wavelength to light to be transmitted.

From the numerical values described above, the phase difference of the liquid crystal layer 50 is 340 nm in the transmissive display region T, and is 140 nm in the reflective display region R. The liquid crystal display 100 of this embodiment has the above-described configuration.

Next, the advantages of the arrangement of the slope portion 25b will be described with reference to the drawings. The optical direction of each constituent member of the liquid crystal display 100 will be first described with reference to FIGS. 4A to 4D, and then the optical behavior in the region overlapping the slope portion 25b in plan view will be described with reference to FIGS. 5A and 5B. The "optical direction of each constituent member" includes the direction of the transmission axes of the polarizing plates 14 and 24, the alignment regulation directions of the alignment films 18 and 28 defining the alignment direction of the liquid crystal layer 50, or the direction of the slow axis of the phase layer 26.

FIGS. 4A to 4D are explanatory views illustrating the optical direction of each constituent member in the liquid crystal display 100 of this embodiment. Each constituent member will be described with reference to reference numerals in FIG. 3.

Figure 4A:
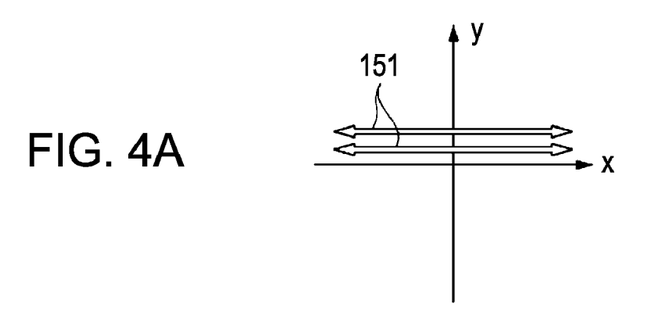
FIGS. 4A to 4D are explanatory views illustrating optical directions of constituent members in the liquid crystal display of this embodiment.

FIG. 4A illustrates the alignment regulation directions 151 of the alignment films 18 and 28 (the alignment direction in the initial alignment state). The alignment regulation directions 151 of the alignment films 18 and 28 are substantially parallel to each other. For this reason, the liquid crystal molecules of the liquid crystal layer 50 interposed between the alignment films 18 and 28 have homogeneous alignment according to the alignment regulation directions 151. As shown in FIG. 2, the alignment regulation directions 151 intersect the electric field generation direction v when voltage is applied. In the following description with reference to FIGS. 4A to 4D, the optical direction of each member will be described on an assumption that a direction parallel to each alignment regulation direction 151 is an x-axis direction, and a direction perpendicular to each alignment regulation direction 151 is a y-axis direction.

Figure 4B:
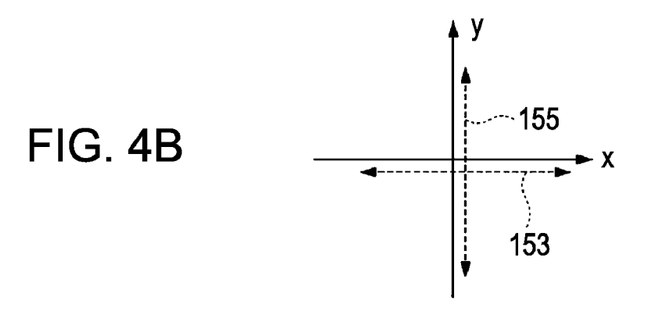

FIG. 4B illustrates a transmission axis 153 of the polarizing plate 14 and a transmission axis 155 of the polarizing plate 24. The polarizing plates 14 and 24 are provided under a crossed nicols condition such that the transmission axes thereof are perpendicular to each other, and one of the transmission axes is in the same direction as the alignment regulation direction 151. In the drawings, the alignment regulation direction 151 and the transmission axis 153 are in the same direction.

Figure 4C:
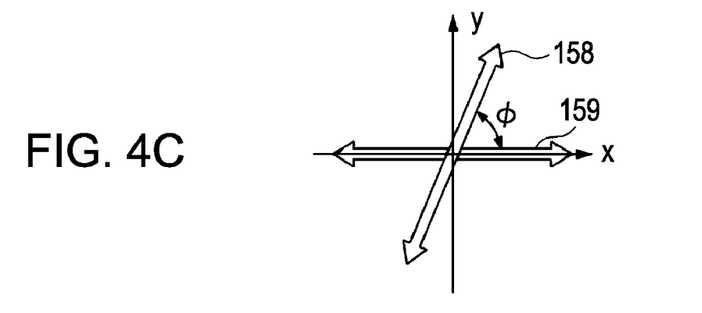

FIG. 4C illustrates a slow axis 158 of the reflective portion phase layer 26r and a slow axis 159 of the transmissive portion phase layer 26t. The slow axis 158 is set so as to be inclined by an inclination $\phi=67.5°$ in the counterclockwise direction from the x-axis direction, and the slow axis 159 is set in the same direction as the alignment regulation direction (x-axis direction). The slow axis 159 may be set in the same direction as the y-axis direction.

Figure 4D:
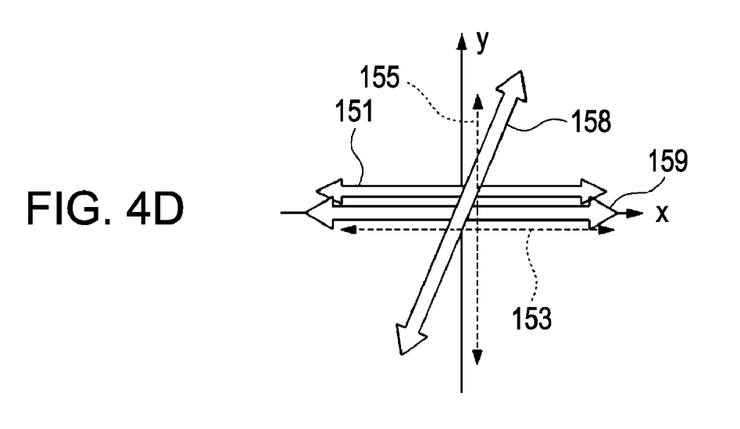

FIG. 4D simultaneously illustrates the relations of FIGS. 4A to 4C. As shown in FIG. 4D, in the liquid crystal display 100 of this embodiment, the alignment regulation direction 151 (that is, the initial alignment direction of the liquid crystal molecules of the liquid crystal layer 50), the transmission axis 153, and the slow axis 159 are identical. The transmission axis 155 is perpendicular to the alignment regulation direction 151, the transmission axis 153, and the slow axis 159. The slow axis 158 intersects the alignment regulation direction 151, the transmission axis 153, and the slow axis 159 at an angle of 67.5°.

Figure 5A:
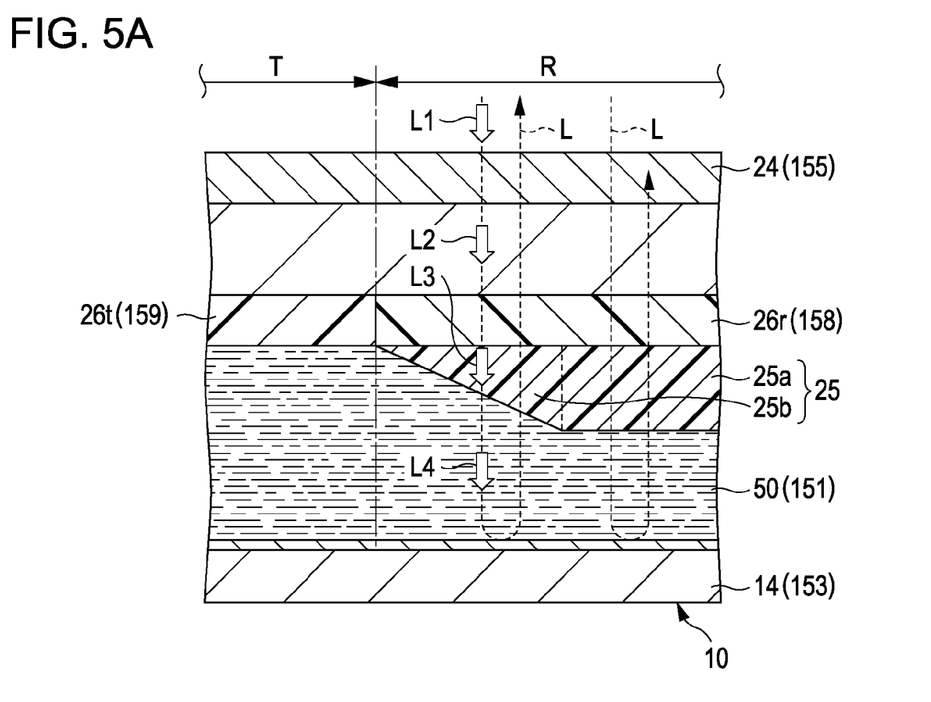
FIGS. 5A and 5B are explanatory views illustrating the advantages of the invention.
Figure 5B:
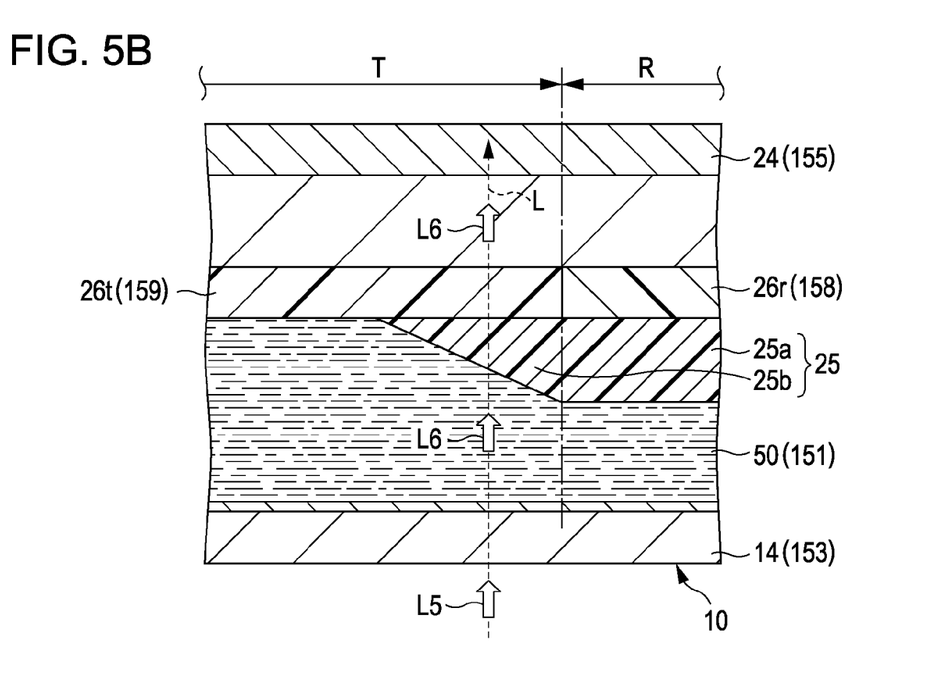

FIGS. 5A and 5B are explanatory views illustrating the advantages of the invention and are schematic sectional views of a liquid crystal display having the optical directions of constituent members, as shown in FIG. 4. First, problems when the slope portion 25b of the liquid crystal layer thickness adjusting layer 25 is disposed in a region overlapping the reflective display region R in plan view will be described with reference to FIG. 5A. Next, advantages when the slope portion 25b of the liquid crystal layer thickness adjusting layer 25 is disposed in a region overlapping the transmissive display region T in plan view will be described with reference to FIG. 5B. In FIGS. 5A and 5B, reference numerals representing the optical directions of the constituent members shown in FIG. 4 are put in brackets.

As shown in FIG. 5A, it is considered that light L is incident on the region overlapping the slope portion 25b of the reflective display region R. First, if incident light L1 incoming from the normal direction transmits the polarizing plate 24, incident light L1 is converted into linearly polarized light L2 having a vibration plane of an electric field parallel to the transmission axis 155. Linearly polarized light L2 is incident on the reflective portion phase layer 26r.

Next, if linearly polarized light L2 transmits the reflective portion phase layer 26r, linearly polarized light L2 is inclined by 45° in the counterclockwise direction from the x-axis direction due to the λ/2 phase plate, as indicated by the x-y coordinates of FIGS. 4A to 4D, and becomes linearly polarized light L3. Linearly polarized light L3 is incident on the liquid crystal layer thickness adjusting layer 25. The liquid crystal layer thickness adjusting layer 25 has no optically active axis of direction. Therefore, linearly polarized light L3 transmits the liquid crystal layer thickness adjusting layer 25 without being influenced by polarization, and is incident on the liquid crystal layer 50.

The liquid crystal molecules of the liquid crystal layer 50 are aligned in the same direction of the alignment regulation direction 151 in the initial alignment state. Therefore, linearly polarized light L3 is incident at an angle of 45° with respect to the liquid crystal molecules of the liquid crystal layer 50. That is, linearly polarized light L3 is incident at such an angle as to be optically influenced by the liquid crystal molecules of the liquid crystal layer 50.

The liquid crystal layer 50 that overlaps the reflective display region R varies in thickness between a region that overlaps a flat portion 25a having a substantially uniform thickness as designed and a region that overlaps the slope portion 25b not as designed. For this reason, in the liquid crystal layer 50 of a region overlapping the slope portion 25b, light is optically influenced by the liquid crystal molecules long by a difference in thickness of the liquid crystal layer 50 due to the slope. As a result, light is reflected by the reflective common electrode in the element substrate 10 in a polarization state different from as designed, goes against the optical path, and reaches the polarizing plate 24. Light L incident on the region overlapping the slope portion 25b reaches the polarizing plate 24 in a polarization state different from as designed. For this reason, light cannot be completely shielded by the polarizing plate 24, and part of light is transmitted. Light to be partially transmitted is observed as light leakage, and light leakage causes deterioration of a contrast ratio.

Meanwhile, as shown in FIG. 5B, it is considered that the slope portion 25b is disposed in a region overlapping the transmissive display region T, and light L is incident on a region of the transmissive display region T overlapping the slope portion 25b. First, if incident light L5 incident from the normal direction transmits the polarizing plate 14, incident light L5 is converted into linearly polarized light L6 having a vibration plane of an electric field parallel to the transmission axis 153. Linearly polarized light L6 is incident on the liquid crystal layer 50.

The transmission axis 153 and the alignment regulation direction 151, which is the alignment direction of the liquid crystal molecules of the liquid crystal layer 50 are parallel to each other. Therefore, linearly polarized light L6 reaches the slope portion 25b without being optically influenced by the liquid crystal molecules of the liquid crystal layer 50.

The material forming the slope portion 25b has no optically active axis of direction. For this reason, linearly polarized light L6 is incident on the transmissive portion phase layer 26t without being optically influenced even in the slope portion 25b.

The transmission axis 153 and the slow axis 159 are parallel to each other. Therefore, linearly polarized light L6 transmits the transmissive portion phase layer 26t without being optically influenced by the liquid crystal molecules of the liquid crystal layer 50, and reaches the polarizing plate 24. The transmission axis 155 of the polarizing plate 24 and the transmission axis 153 of the polarizing plate 14 are perpendicular to each other. For this reason, linearly polarized light L6 having a vibration plane of an electric field perpendicular to the transmission axis 155 is shielded by the polarizing plate 24. In such a case, with focusing on the reflective display region R, no slope portion 25b is provided in the region overlapping the reflective display region R. Therefore, the liquid crystal layer does not vary in thickness, and the problems described with reference to FIG. 5A do not occur. As a result, satisfactory dark display can be performed as designed.

As described above, on the basis of the behavior of light that, when an optically active axis of direction is perpendicular or parallel to linearly polarized light, light is not optically influenced, if the slope portion 25b is disposed in the transmissive display region T, and the optical directions of the constituent members are controlled, it is possible to provide the liquid crystal display 100 that can realize a high contrast ratio while suppressing light leakage.

According to the liquid crystal display 100 having the above-described configuration, the slope portion 25b in which the liquid crystal layer 50 continuously varies in thickness and which causes a phase difference due to a difference in optical path is disposed in the transmissive display region T. Light incident on the slope portion 25b transmits the liquid crystal layer 50 that is aligned so as to be optically inactive with respect to incident light, and thus light is not optically influenced until it is incident on the slope portion 25b. For this reason, light transmitting the slope portion 25b has no phase difference, and light transmits the transmissive portion phase layer 26t and is satisfactorily shielded by the polarizing plate 24. Therefore, in the transmissive display region T where the slope portion 25b is disposed, it is possible to provide the liquid crystal display 100 that can perform high-contrast display without light leakage.

In this embodiment, the reflective portion phase layer 26r and the transmissive portion phase layer 26t of the phase layer 26 are formed by polymerizing a polymerizable liquid crystal material in a liquid crystal phase state having different alignment directions. For this reason, the transmissive portion phase layer 26t and the reflective portion phase layer 26r can be formed while the alignment directions thereof can be easily controlled. The phase layer 26 can be a flat layer having a uniform thickness. For this reason, there is no difference in optical path due to the difference in thickness of the phase layer 26 or a composite change in thickness of the liquid crystal layer caused by the difference in thickness and the shape of the slope portion 25b. Therefore, by managing the arrangement of the slope portion 25b, high-contrast display can be performed without light leakage. In addition, design and manufacturing are facilitated, as compared with a case in which the transmissive portion phase layer 26t and the reflective portion phase layer 26r are separately formed.

In this embodiment, the optical axis 158 of the reflective portion phase layer 26r is set so as to be inclined at approximately 67.5° with respect to the alignment direction 151 of the liquid crystal layer 50. Linearly polarized light transmitting the reflective portion phase layer 26r is set so as to be inclined at approximately 45° with respect to the initial alignment direction of the liquid crystal layer 50. In the reflective display region R, the liquid crystal layer 50 is formed to have such a thickness as to give a phase difference of approximately λ/4 wavelength with respect to incident light when being not driven. If light transmits the reflective portion phase layer 26r and the liquid crystal layer 50 designed in such a manner, linearly polarized light incident on the reflective display region R can be satisfactorily converted into broader circularly polarized light, and higher contrast of reflective display can be realized.

Although in this embodiment, the FFS mode is used, according to the technical spirit of the invention, an IPS mode which is another example of the transverse electric field mode may be used.

The direction of the optical axis of each constituent member in this embodiment is just an example. Alternatively, the direction of another optical axis may be used insofar as it is perpendicular to the transmission axis of the polarizing plate, and is perpendicular or parallel to the directions of the optical axes of other constituent members.

In this embodiment, an electrode near the liquid crystal layer 50 with slits formed therein is connected to the TFT 30 as the pixel electrode 9, and an electrode away from the liquid crystal layer 50 is the common electrode. Alternatively, the common electrode may be an electrode near the liquid crystal layer 50, the pixel electrode may be an electrode away from the liquid crystal layer 50, and slits may be formed in the common electrode.

Although in this embodiment, the strip electrode portions 9c and 9d and the slits 29 and 39 of the pixel electrode 9 are different in width, the strip electrode portions 9c and 9d and the slits 29 and 39 may have a uniform width.

Although in this embodiment, the liquid crystal molecules of the liquid crystal layer 50 have positive dielectric anisotropy, the liquid crystal molecules may have a negative dielectric anisotropy. In this case, preferably, the extension direction of the strip electrode portions of the pixel electrode 9 is changed in accordance with the alignment direction of the liquid crystal molecules, and the strip electrode portions are formed in a direction at 85° with respect to the initial alignment direction of the liquid crystal molecules.

In this embodiment, the common electrode 19 overlapping the reflective display region R is formed of a light-reflective metal material to form the reflective common electrode 19r. Alternatively, the common electrode may be formed of a light-transmissive conductive material, and a light reflecting layer having a light reflection function may be provided separately from the common electrode to reflect light. In this case, the pixel electrode and the common electrode are formed so as to be interposed between the light reflecting layer and the liquid crystal layer. If the light reflecting layer has an uneven surface to scatter light reflected by the light reflecting layer, it is possible to form the reflective display region R having a wide viewing angle.

Although in this embodiment, the TFT 30 is used as a driving element, a TFD (Thin Film Diode) may be used.

Second Embodiment

Figure 6:
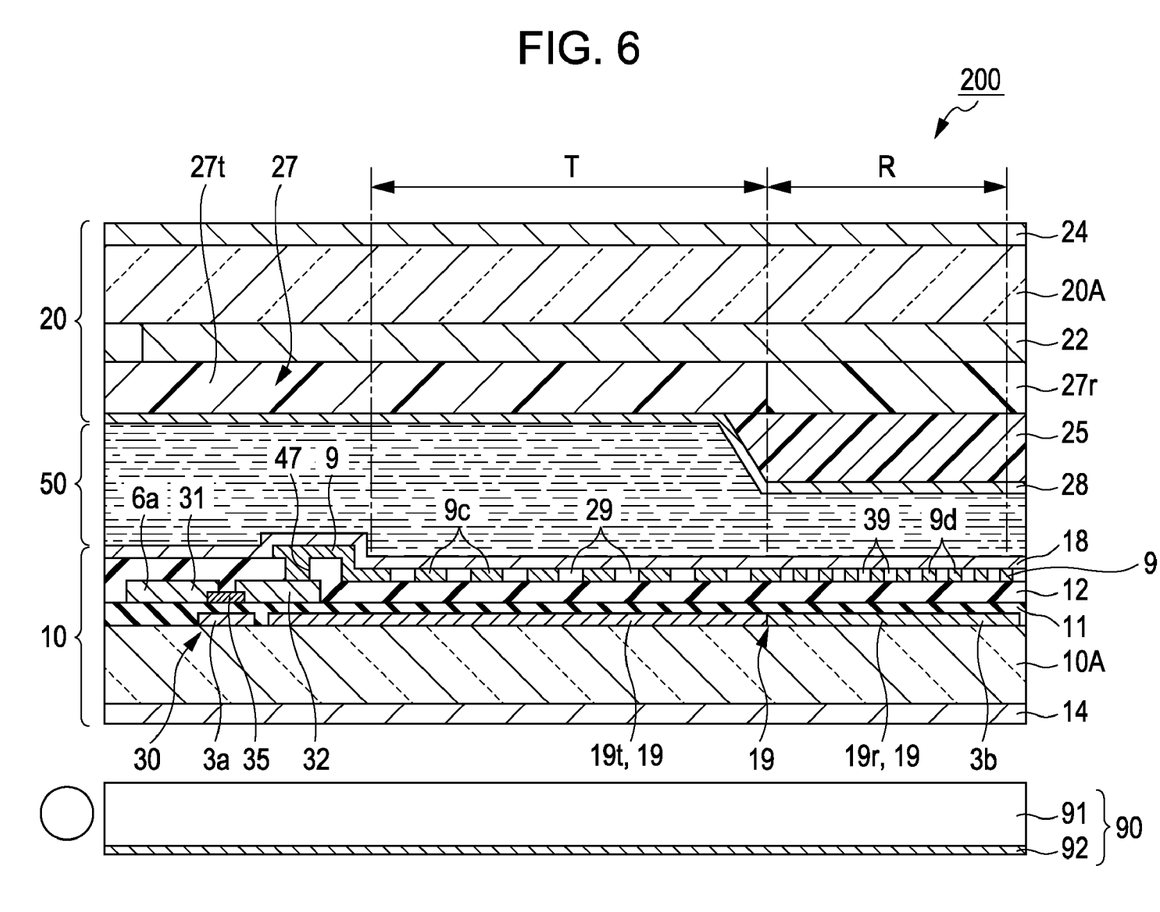
FIG. 6 is a sectional view illustrating the configuration of a liquid crystal display according to a second embodiment of the invention.

FIG. 6 is an explanatory view of a liquid crystal display according to a second embodiment of the invention. A liquid crystal display 200 of this embodiment is partially in common with the liquid crystal display of the first embodiment. A difference is that the phase layer (resin layer) 27 includes an isotropic layer (first resin layer) 27t, which is formed in an isotropic phase state having no optically active direction. Therefore, in this embodiment, the same constituent elements as those in the first embodiment are represented by the same reference numerals, and descriptions thereof will be omitted.

The isotropic layer 27t is formed in an isotropic phase state. For this reason, light incident on the transmissive display region T is not optically influenced when it transmits the isotropic layer 27t. Therefore, if the alignment direction of the liquid crystal molecules of the liquid crystal layer 50 is set in the same direction as one of the transmission axes of the polarizing plates 14 and 24 under a crossed nicols condition, leakage of light transmitting the slope portion 25b can be suppressed.

The phase layer 27 can be formed, for example, by the following method. First, an alignment film (not shown) for forming the phase layer is formed on the color filter 22, and a rubbing treatment is performed on the alignment film. Next, liquid crystal having an optical functional group forming the phase layer is coated on the alignment film and aligned separately in the rubbing directions. Thereafter, light is irradiated only onto the region overlapping the reflective display region R to harden the polymerizable liquid crystal material. Thus, a reflective portion phase layer (second resin layer) 27r is formed. Next, the temperature increases so as to be equal to or more than an isotropic phase transition temperature of liquid crystal having an optical functional group, and light is irradiated onto an unhardened portion to harden the unhardened. In this way, the reflective portion phase layer 27r and the isotropic layer 27t can be separately formed in the single phase layer 27.

According to the liquid crystal display 200 having the above-described configuration, the slope portion 25b in which the liquid crystal layer 50 continuously changes in thickness and which causes a phase difference due to a difference in optical path is disposed in the transmissive display region T. Light incident on the slope portion 25b transmits the liquid crystal layer 50 that is aligned so as to be optically inactive with respect to incident light, and thus light is not optically influenced until it is incident on the slope portion 25b. For this reason, light transmitting the slope portion 25b has no phase difference, and light transmits the isotropic layer 27t in the isotropic phase state and is satisfactorily shielded by the polarizing plate 24. Therefore, in the transmissive display region T where the slope portion 25b is disposed, it is possible to provide the liquid crystal display 200 that can perform high-contrast display without light leakage.

In this embodiment, the reflective portion phase layer 27r and the isotropic layer 27t of the phase layer 27 are formed by polymerizing a polymerizable liquid crystal material having different phase states. For this reason, the isotropic layer 27t and the reflective portion phase layer 27r can be formed while the alignment states thereof can be easily controlled. The phase layer 27 can be a flat layer having a uniform thickness. For this reason, there is no difference in thickness of the phase layer 27 or no composite change in the liquid crystal layer due to the difference in thickness and the shape of the slope portion 25b, and thus there is no difference in optical path due to the change in thickness. Therefore, by managing the arrangement of the slope portion 25b, high-contrast display can be performed without light leakage. In addition, design and manufacturing are facilitated, as compared with a case in which the isotropic layer 27t and the reflective portion phase layer 27r are separately formed.

Electronic Apparatus

Figure 7:
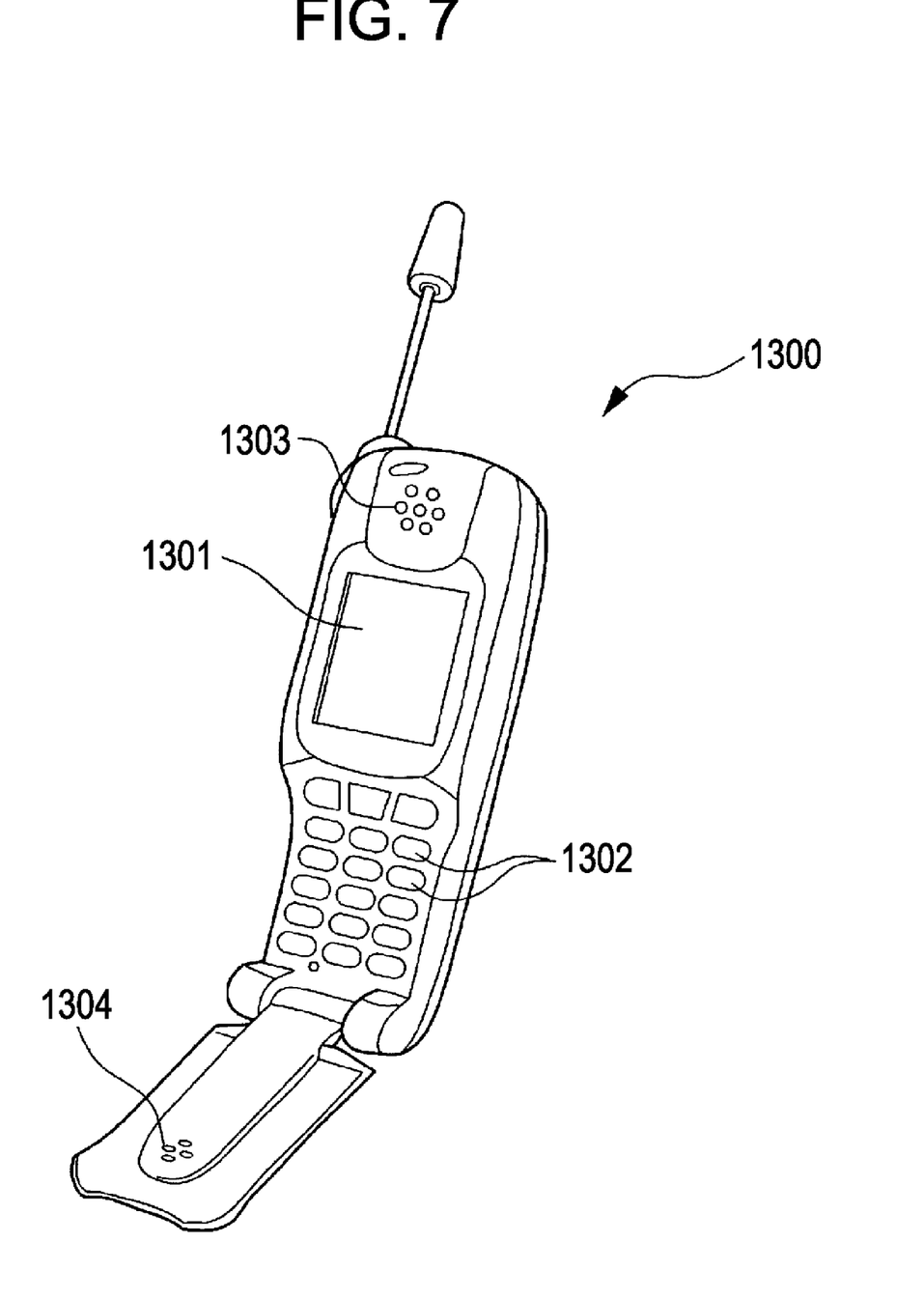
FIG. 7 is a perspective view illustrating an example of an electronic apparatus according to the invention.

Next, an embodiment of an electronic apparatus according to the invention will be described. FIG. 7 is a perspective view illustrating an example of the electronic apparatus according to the invention. A mobile phone 1300 shown in FIG. 7 includes the above-described liquid crystal display as a small display section 1301, a plurality of operating buttons 1302, a receiver 1303, and a transmitter 1304. Therefore, it is possible to provide the mobile phone 1300 including a display section, which has a wide viewing angle and a high contrast ratio, and is formed by the above-described liquid crystal display.

The liquid crystal display according to each of the foregoing embodiments may not be limited to the mobile phone, but it may be used as an image display unit of an electronic book, a personal computer, a digital still camera, a television set, a viewfinder-type or monitor-direct-view-type video tape recorder, a car navigation apparatus, a pager, an electronic organizer, an electronic calculator, a word processor, a workstation, a video phone, a POS terminal, and an apparatus including a touch panel. With this configuration, it is possible to provide an electronic apparatus including a display section having high display quality and excellent reliability.

Although the embodiments of the invention has been described with reference to the accompanying drawings, the invention is not limited to the embodiments. The shapes of the constituent members and a combination of the constituent members in the foregoing embodiments are just illustrative examples, and can be changed or modified based on the design requirements, without departing from the scope or spirit of the invention.

The entire disclosure of Japanese Patent application No. 2008-106464, field Apr. 16, 2008 is expressly incorporated by reference herein.

What is claimed is:

1. A liquid crystal display comprising:
   a first substrate and a second substrate that are disposed to face each other,
   a liquid crystal layer interposed between the first substrate and the second substrate, the liquid crystal layer having a substantially horizontal alignment in an initial alignment state,
   first and second electrodes provided between the liquid crystal layer and the first substrate, wherein the first electrode is formed on the first substrate and the second electrode is formed on an insulating film disposed over the first electrode,
   a reflecting layer provided between the liquid crystal layer and the first substrate,
   a pixel region including a reflective display region where light incoming from the second substrate is reflected by the reflecting layer toward the second substrate to perform display and a transmissive display region where light incoming from the first substrate is transmitted toward the second substrate to perform display,
   a first polarizing plate provided on a side of the first substrate opposite the liquid crystal layer, the first polarizing plate having a transmission axis parallel or perpendicular to an alignment direction of the liquid crystal layer in the initial alignment state,
   a second polarizing plate provided on a side of the second substrate opposite the liquid crystal layer, the second polarizing plate having a transmission axis substantially perpendicular to the transmission axis of the first polarizing plate,
   a resin layer provided between the second substrate and the liquid crystal layer, the resin layer having:
      a first resin layer provided in the transmissive display region, the first resin layer being a λ/2 phase layer giving a phase difference of approximately ½ wavelength (wavelength: λ) to visible light, a slow axis of the first resin layer and the transmission axis of the first polarizing plate, being disposed so as to be substantially parallel or perpendicular to each other, wherein a TFT having a source electrode, a semiconductor layer, and a drain electrode is formed directly below the first resin layer disposed in the transmissive display region, and
      a second resin layer provided in the reflective display region, the second resin layer being a λ/2 phase layer giving a phase difference of approximately ½ wavelength with respect to visible light, and a slow axis of the second resin layer is set in a direction intersecting the alignment direction of the liquid crystal layer; and
      a step portion provided on the second resin layer in order to make a thickness of the liquid crystal layer in the reflective display region smaller than a thickness of the liquid crystal layer in the transmissive display region, the step portion including a slope portion having a continuously changing thickness, the slope portion being disposed in the transmissive display region.

2. A liquid crystal display comprising:
   a first substrate and a second substrate that are disposed to face each other,
   a liquid crystal layer interposed between the first substrate and the second substrate, the liquid crystal layer having a substantially horizontal alignment in an initial alignment state,
   first and second electrodes provided between the liquid crystal layer and the first substrate, wherein the first electrode is formed on the first substrate and the second electrode is formed on an insulating film disposed over the first electrode,
   a reflecting layer provided between the liquid crystal layer and the first substrate,
   a pixel region including a reflective display region where light incoming from the second substrate is reflected by the reflecting layer toward the second substrate to perform display and a transmissive display region where light incoming from the first substrate is transmitted toward the second substrate to perform display, a first polarizing plate provided on a side of the first substrate opposite the liquid crystal layer, the first polarizing plate having a transmission axis parallel or perpendicular to an alignment direction of the liquid crystal layer in the initial alignment state, a second polarizing plate provided on a side of the second substrate opposite the liquid crystal layer, the second polarizing plate having a transmission axis substantially perpendicular to the transmission axis of the first polarizing plate, a resin layer provided between the second substrate and the liquid crystal layer, the resin layer having:
  a first resin layer provided in the transmissive display region, the first resin layer being an isotropic layer having no optical anisotropy with respect to visible light, wherein a TFT having a source electrode, a semiconductor layer, and a drain electrode is formed directly below the first resin layer disposed in the transmissive display region, and
  a second resin layer provided in the reflective display region, the second resin layer being a $\lambda/2$ phase layer giving a phase difference of approximately ½ wavelength with respect to visible light, and a slow axis of the second resin layer is set in a direction intersecting the alignment direction of the liquid crystal layer; and
  a step portion provided on the second resin layer in order to make a thickness of the liquid crystal layer in the reflective display region smaller than a thickness of the liquid crystal layer in the transmissive display region, the step portion including a slope portion having a continuously changing thickness, the slope portion being disposed in the transmissive display region.

3. The liquid crystal display according to claim 1, wherein the resin layer is formed of a polymerizable liquid crystal material to have a uniform thickness.

4. The liquid crystal display according to claim 1, wherein the liquid crystal layer of the reflective display region has such a thickness as to give a phase difference of approximately $\lambda/4$ wavelength with respect to light transmitting through the liquid crystal layer in the initial alignment state, and an acute angle between the slow axis of the second resin layer and the alignment direction of the liquid crystal is 67.5°.

5. An electronic apparatus comprising the liquid crystal display according to claim 1.

* * * * *